United States Patent
Schmieder et al.

(10) Patent No.: US 8,438,260 B2
(45) Date of Patent: *May 7, 2013

(54) SHARING A PORT WITH MULTIPLE PROCESSES

(75) Inventors: Robert Wilhelm Schmieder, Snoqualmie, WA (US); Joy Chik, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/354,611

(22) Filed: Jan. 20, 2012

(65) Prior Publication Data

US 2012/0124190 A1 May 17, 2012

Related U.S. Application Data

(63) Continuation of application No. 11/304,780, filed on Dec. 15, 2005, now Pat. No. 8,166,175.

(60) Provisional application No. 60/716,334, filed on Sep. 12, 2005.

(51) Int. Cl.
G06F 15/173 (2006.01)

(52) U.S. Cl.
USPC ........... 709/223; 709/227; 709/217; 709/220; 709/222; 709/230

(58) Field of Classification Search .................. 709/227, 709/217, 223, 220, 222, 230
See application file for complete search history.

(56) References Cited

U.S. PATENT DOCUMENTS

| | | | |
|---|---|---|---|
| 5,699,513 A | 12/1997 | Feigen | |
| 5,719,942 A * | 2/1998 | Aldred et al. | 709/228 |
| 6,182,146 B1 | 1/2001 | Graham-Cumming | |
| 6,357,337 B1 * | 3/2002 | Alvarez et al. | 92/98 R |
| 6,363,081 B1 | 3/2002 | Gase | |
| 6,622,159 B1 * | 9/2003 | Chao et al. | 709/203 |
| 6,763,387 B1 | 7/2004 | Hickey | |

(Continued)

FOREIGN PATENT DOCUMENTS

| | | |
|---|---|---|
| CN | 1304158 | 9/2004 |
| JP | 06-301616 | 10/1994 |
| JP | 2001195262 | 7/2001 |
| JP | 2003050756 | 2/2003 |

OTHER PUBLICATIONS

U.S. Appl. No. 11/304,780, Oct. 29, 2009, Office Action.
U.S. Appl. No. 11/304,780, Apr. 26, 2010, Office Action.

(Continued)

*Primary Examiner* — Lan-Dai T Truong
(74) *Attorney, Agent, or Firm* — Workman Nydegger

(57) ABSTRACT

A port listening service operating in at system level is assigned to listen on a static port. The static port can index a plurality of unique IDs associated with a plurality of applications operating in a session level. The server application can then provide to a client the unique connection ID, the IP address of the server, and the static port number for a connection. If the client connects by referencing the unique connection ID, the port listening service can forward a corresponding socket for the connection to the appropriate application instance, such that the application still operates in a session level. As such, the port listening service can dispatch connection services for a single static port to multiple different application instances running in a session level.

18 Claims, 6 Drawing Sheets

U.S. PATENT DOCUMENTS

| | | |
|---|---|---|
| 6,917,610 B1 * | 7/2005 | Kung et al. .................. 370/352 |
| 7,523,185 B1 * | 4/2009 | Ng et al. ..................... 709/223 |
| 2002/0016868 A1 | 2/2002 | Peacock |
| 2002/0016926 A1 | 2/2002 | Nguyen |
| 2002/0124089 A1 | 9/2002 | Aiken |
| 2002/0178268 A1 | 11/2002 | Aiken |
| 2003/0028681 A1 | 2/2003 | Jain |
| 2004/0181694 A1 | 9/2004 | Cox |
| 2005/0108723 A1 | 5/2005 | Burckart |
| 2005/0125692 A1 | 6/2005 | Cox |
| 2005/0180398 A1 | 8/2005 | Deno |
| 2006/0015729 A1 | 1/2006 | Novack |
| 2006/0126619 A1 | 6/2006 | Teisberg |
| 2006/0216619 A1 | 9/2006 | Iwasaki |
| 2006/0277275 A1 | 12/2006 | Glaenzer |
| 2007/0220051 A1 | 9/2007 | Brentano |
| 2010/0023626 A1 * | 1/2010 | Hussain et al. ............... 709/227 |

OTHER PUBLICATIONS

U.S. Appl. No. 11/304,780, Sep. 23, 2010, Office Action.
U.S. Appl. No. 11/304,780, Jan. 19, 2011, Office Action.
U.S. Appl. No. 11/304,780, Jun. 21, 2011, Office Action.
U.S. Appl. No. 11/304,780, Oct. 28, 2011, Notice of Allowance.

* cited by examiner

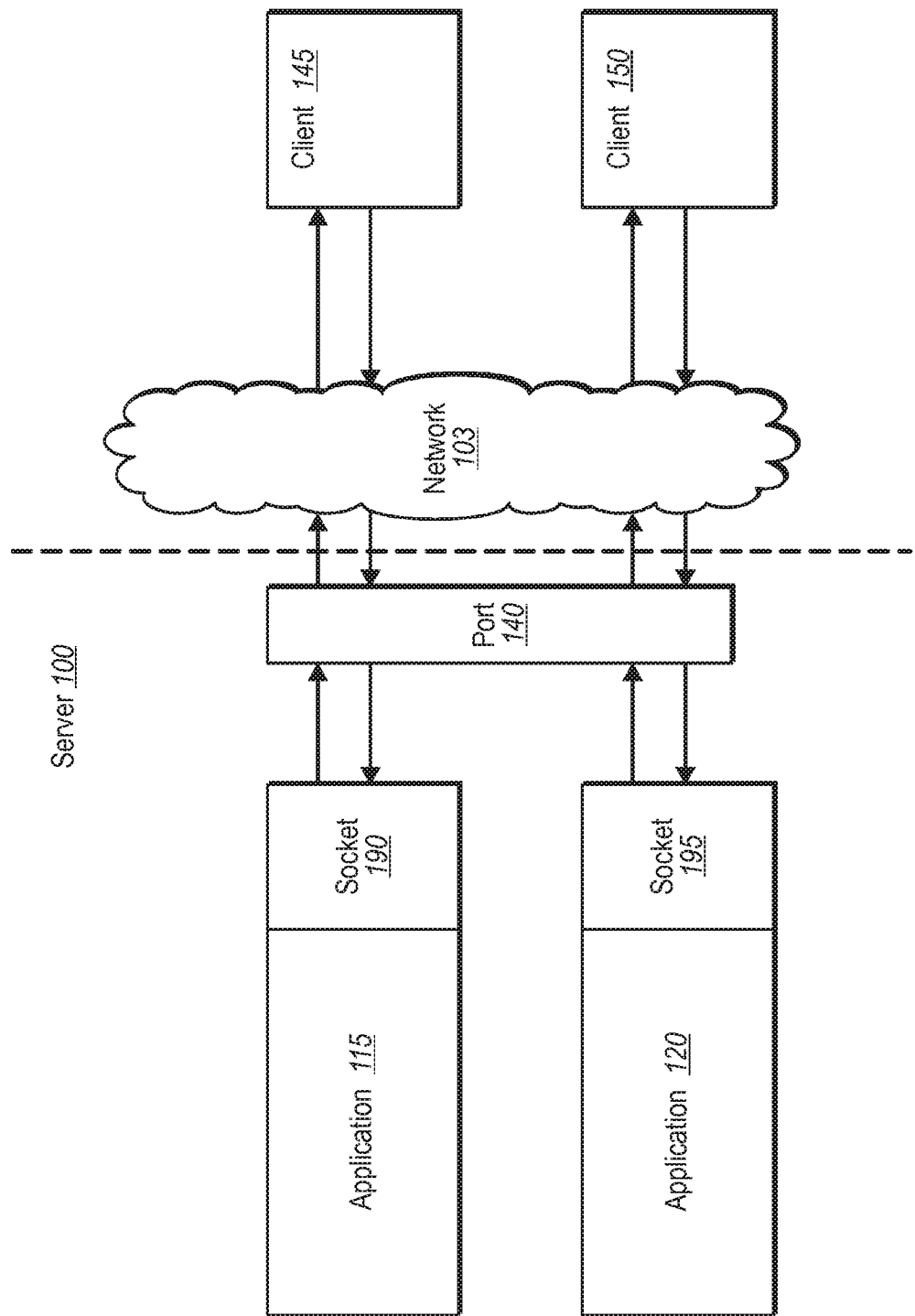

SHARING A PORT WITH MULTIPLE PROCESSES

CROSS-REFERENCE TO RELATED APPLICATIONS

The present invention claims the benefit of priority to U.S. Provisional Patent Application No. 60/716,334, filed on Sep. 12, 2005, entitled "Sharing a Listening Socket Between Multiple Processes," and a continuation of U.S. patent application Ser. No. 11/304,780, filed on Dec. 15, 2005, entitled "Sharing a Port with Multiple Processes" the entire contents of which are incorporated herein by reference.

BACKGROUND

Background and Relevant Art

As computerized systems have increased in popularity, so have the needs to distribute files and processing resources of computer systems in networks both large and small. In general, computer systems and related devices communicate information over a network for a variety of reasons, for example, to exchange personal electronic messages, sell merchandise, provide account information, and so forth. One will appreciate, however, that as computer systems and their related applications have become increasingly more sophisticated, the challenges associated with sharing data and resources on a network have also increased.

Some current ways for distributing resources within a network include centralized computing scenarios, which can involve a centralized network server sharing resources with one or more clients that do not have those resources installed locally. One such protocol that has been used for this type of functionality is the Remote Desktop Protocol ("RDP"). With the Remote Desktop Protocol, a centralized network server can share data and resources of interest with other clients on a network. In some cases, the clients may then be able to interact (e.g., sending mouse and keyboard events, etc.) with those resources just as though those resources were installed locally. Ideally, this interaction between the client computer system and network server occurs seamlessly as though the client computer system had processed the data locally with its own installed resources.

Another type of system that is similar in some respects to the centralized sharing model described above involves a server (or "sending") computer system configured to share application data with other client computer systems on a network. In this example, the server initiates an Application Program Interface (or "API"), such as a "collaboration API," which it then uses to share data views with one or more client (or "receiving") computer systems. The client computer systems can then process the shared data locally for display, similar to the centralized computing scenario described above.

Unfortunately, there are a number of potential difficulties with these types of systems that can make it difficult to share data generated by an application over a network with more than a relatively small number of client computer systems. For example, when the sharing computer system initiates the application for sharing data, the server application will initiate a port listener at the sharing computer system, and then listen for an invited client to connect through that port. A variety of invited clients can then connect to this server application through this port. Unfortunately, a different server application would be precluded from establishing a different listener on that same port, and thereby receive different network connections.

One reason why there is typically only one application listener per port is that, within the context of the Transmission Control Protocol ("TCP"), the only data that are used in initiating a connection are the Internet Protocol ("IP") address and the computer port number. This is generally not enough information for the network server to differentiate applications when receiving connection data through a single port. In particular, even if another client were to attempt to connect with a different instance of an application through a single port reserved by another application, the server would only be able to send the client's connection request data to the initially, reserving instance of the application.

Another reason that only one application will typically reserve a given port, as described above, is because the given application may be operating at a session level (i.e., limited level of computer access) when initiating the port listener. Session level execution is a fairly limited operating level that minimizes an application's exposure to other components in a computer system. It is generally preferable to run applications in session mode since operating at a system level (e.g., computer-wide access) can create operational liabilities for the server. For example, executing an application at a system level could give the application unfettered access to multiple different ports on the server; however, a compromise (e.g., a bug) in the application can result in compromise of the entire server.

The alternative might be for the different application to remain in session level operation, but simply open up different dynamic ports stemming from the same static port. Dynamic ports, however, are often not even an available option in some networks since dynamic ports can be difficult to discover and manage within a firewall. Even further, a network administrator might not just forbid dynamic ports, but, for similar reasons, also restrict the number of available static ports in the first instance for security concerns. Thus, a different application (even a second instance of the same port-reserving application) may even be precluded from simply opening up another different port at the server if all available ports have already been reserved.

Accordingly, there are a number of difficulties in current resource sharing technologies that can be addressed.

BRIEF SUMMARY

Implementations of the present invention solve one or more of the foregoing problems in the art with systems, methods, and computer program products that distinguish different applications through the same static port, while still executing the applications at the session level. In particular, one or more server applications (and different instances thereof) operating in a session can register with corresponding one or more unique connection identifiers ("IDs"), where multiple unique connection IDs can be associated with a port. A port listener operating at the system level can then listen for the unique connection IDs when receiving client connections through the assigned port. Upon recognizing a unique connection ID, the port listener can pass a socket for the connection to the corresponding application, which is operating in the session level, and is registered to the unique connection ID.

For example, a method from a server or sharing computer perspective of providing network connections to a plurality of applications through a single port can involve associating a first connection identifier with a first application and a second connection identifier with a second application. In this case, the first and second applications are operating at a session level. The method can also include receiving a client connection request that includes a port number for the port, a network address for the sharing computer system, and the first connection identifier. In addition, the method can include forwarding the client connection request to the first application so that the first application connects with the client through the port. Furthermore, the method can involve providing a different client connection to the second application through the port corresponding to the port number.

An alternative method in accordance with an implementation of the present invention from a client perspective can involve receiving a first invitation to communicate with a first application at a server computer system. The first invitation includes at least a port number and a first connection identifier. The method can also involve receiving a second invitation to communicate with a second application at the server computer system, where the second invitation also includes at least the port number and a second connection identifier. The client can then perform a step for communicating with the first and second applications at the server through the port number, and in particular, will be communicating with multiple applications through the same static port.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1A illustrates a schematic overview in which multiple applications communicate with corresponding multiple clients through a single port in accordance with an implementation of the present invention;

DETAILED DESCRIPTION

Figure 1B:
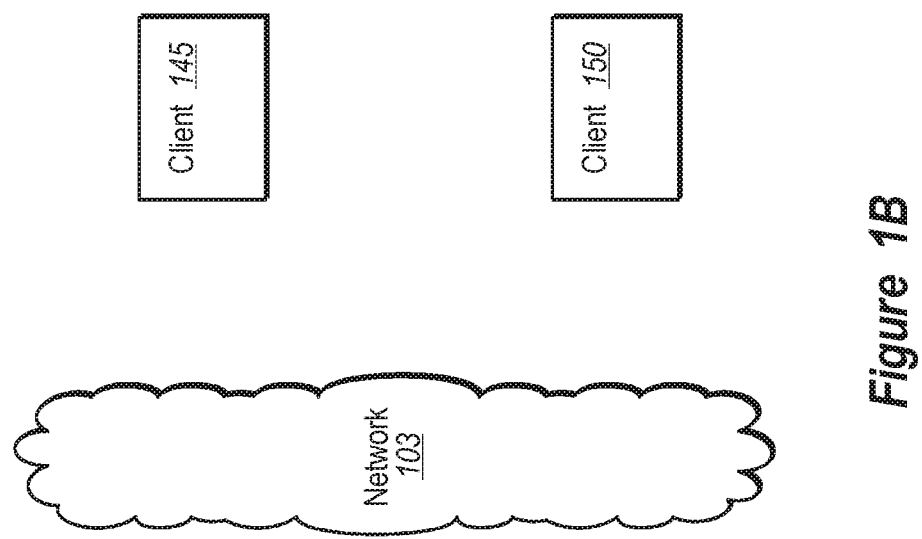
FIG. 1B illustrates a schematic diagram in which multiple applications register unique connection IDs pursuant to communicating through a single port using the same port listening service, in accordance with an implementation of the present invention.
Figure 1B:
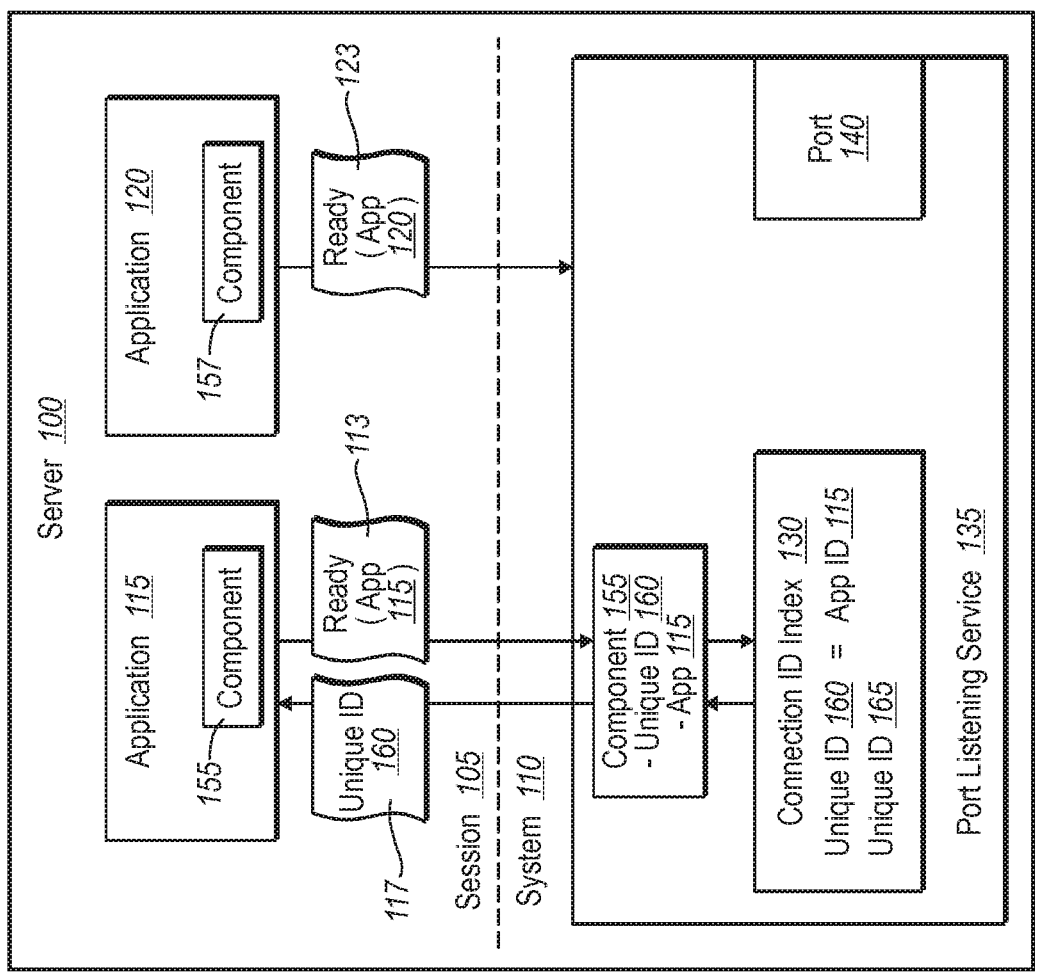

Implementations of the present invention extend to systems, methods, and computer program products that distinguish different applications through the same static port, while still executing the applications at the session level. In particular, one or more server applications (and different instances thereof) operating in a session can register with corresponding one or more unique connection identifiers ("IDs"), where multiple unique connection IDs can be associated with a port. A port listener operating at the system level can then listen for the unique connection IDs when receiving client connections through the assigned port. Upon recognizing a unique connection ID, the port listener can pass a socket for the connection to the corresponding application, which is operating in the session level, and is registered to the unique connection ID.

As will be understood more fully from the following description and claims, these and other features provide much greater network communication flexibility than otherwise available, while at the same time maintaining important security concerns. For example, network administrators can have several network applications communicating through the same static port without using dynamic port assignments, or running these network applications at a system level. In one aspect, this can allow network administrators to keep the number of ports fairly limited without undue concern that important applications will be precluded from network communication. Furthermore, since the network applications can communicate in a session level of operation, there is minimal concern that problems for one application will be transferred across the system.

FIG. 1A illustrates one overview example of how the system can operate in accordance with aspects of the present invention. In particular, FIG. 1A shows that applications 115 and 120 each communicate through the same static port 140 with corresponding different clients 145, 150. Applications 115 and 120 are each able to do this at least in part since each application is associated with a separate, corresponding network communication socket 190, 195, respectively.

In particular, communication sockets 190, 195 are associated with unique connection identifiers ("IDs", also referred to herein as "unique IDs"), both of which are registered for use with the same static port 140. In some cases, such as where the client is clearly identifiable and there is only instance of a given application that is allowed to run, the unique ID can include a client user name or email address. In other cases, the unique connection ID is a randomly generated number. In any event, when port 140 receives TCP communication from client 145 directed to application 115, a listener opened by port listening service (135, FIG. 1B) at port 140 can use the connection ID to identify whether to direct that client communication to application 115 or to application 120 (or some other application, not shown).

FIG. 1B illustrates a more detailed schematic overview of how multiple applications can register with a listening service at a server while maintaining operations at a session level. As a preliminary matter, although the following description and claims make frequent reference to a "server," it will be appreciated that this is by way of one example and not limitation. In particular, server 100 does not necessarily need to be a network server, as commonly understood, and may simply be another client computer system that is acting as a sharing computer system by sharing data with another client computer system over a network.

Nevertheless, FIG. 1B illustrates that server (or "sharing computer") 100 comprises at least a session level 105 (i.e., limited level of computer access) of operations and a system level 110 (e.g., "session 0") of operations. Generally, a session level of operation is the mode in which applications typically run on a computer, and which has limited access to memory and hardware within restricted parameters for a given "session" of operation. By contrast, system level of operation is the processing mode that allows code to have direct access to all hardware and memory in the computer system.

FIG. 1B further illustrates that server 100 includes server applications 115 and 120 (application 120 may be another instance of application 115, or a different application entirely) operating at session level 105. Applications 115 and 120 are merely exemplary of multiple server applications that may be installed at server 100, and there may be many more server applications at server 100 that intend to communicate through a single static port. Examples of applications 115, 120 can include network presentation programs for broadcasting data views from server 100 to one or more other clients, as well as general word processing, spreadsheet programs, or database program, etc.

FIG. 1B further shows that server 100 includes port listening service 135. In one implementation, server 100 initiates port listening service 135 at startup or initial boot, whereby listening service 135 reads any appropriate configuration data (not shown) from the system registry. Generally, listening service 135 performs these various initiation functions while operating in system level 110, in order to ensure access to as many static ports as indicated in the system registry (not shown). In particular, server 100 assigns listening service 135 to listen on one or more static ports, such as port 140 in FIG. 1A. In addition, server 100 can assign listening service 135 to listen to multiple other static ports (not shown). For example, a computer system with multiple network cards, such as network cards servicing an internal network and an external network, might institute the same listening service on multiple static ports for both cards and both networks. When a server application that needs to communicate over a given port is initiated, the server application can send a "ready" message (e.g., 123) to the appropriate port listening service (e.g., 135). The ready message can cause a number of things to happen. For example, in one implementation, the ready message causes listening service to call a connection ID Application Program Interface ("API") (not shown), which in turn creates a unique connection ID, which can be any appropriately secure identifier, such as a randomly generated number. This connection ID is stored in system memory, and referenced in a connection ID index 130 associated with the listening service. For example, the listening service retrieves this unique connection ID from the connection ID API, and then correlates this connection ID with an identifier for the application in an appropriate connection ID index or table, such as connection ID index 130.

In particular, FIG. 1B shows that server application 120 sends ready message 123 to port listening service 135, while sever application 115, which is further along in the process, has already sent ready message 113. Generally, the server application sends the ready message through a socket (e.g., 190, 195, FIGS. 1A, 1D), which will ultimately be used by the server application when server 100 provides it with control of the socket. When sending the message, the server application also includes an identifier for the application, which can be correlated with the created connection ID. For example, FIG. 1B shows that message 113 includes the application identifier "App 115," while message 123 includes the application identifier "App 120."

The ready message can also cause the appropriate listening service to establish a component object, or an equivalent, to interface between the system level 110 and the session level 105 of server 100. In one implementation, this is a Component Operating Model ("COM") object; while, in other implementations, this component object may be a Remote Procedure Call ("RPC") mechanism, named pipes, or any other inter-process communication mechanism. Nevertheless, FIG. 1B shows that port listening service 135 hosts component object 155, which includes a reference both to an identifier (i.e., "App 115") for application 115, as well as to unique connection ID 160 found in index 130, and created by the connection ID API.

The created component object can then return this unique ID to the server application for later use in a client connection. For example, FIG. 1B shows that component 155 sends message 117 to application 115, where message 117 contains unique ID 160. In some cases, message 117 can also include the network address and port number (i.e., port 140) that will be used for connecting with other clients. Most generally, however, pre-connection data can comprise at least unique connection ID 160 and a port number (not shown) associated with port 140. As mentioned, the server application ultimately sends the pre-connection data to a client.

Figure 1C:
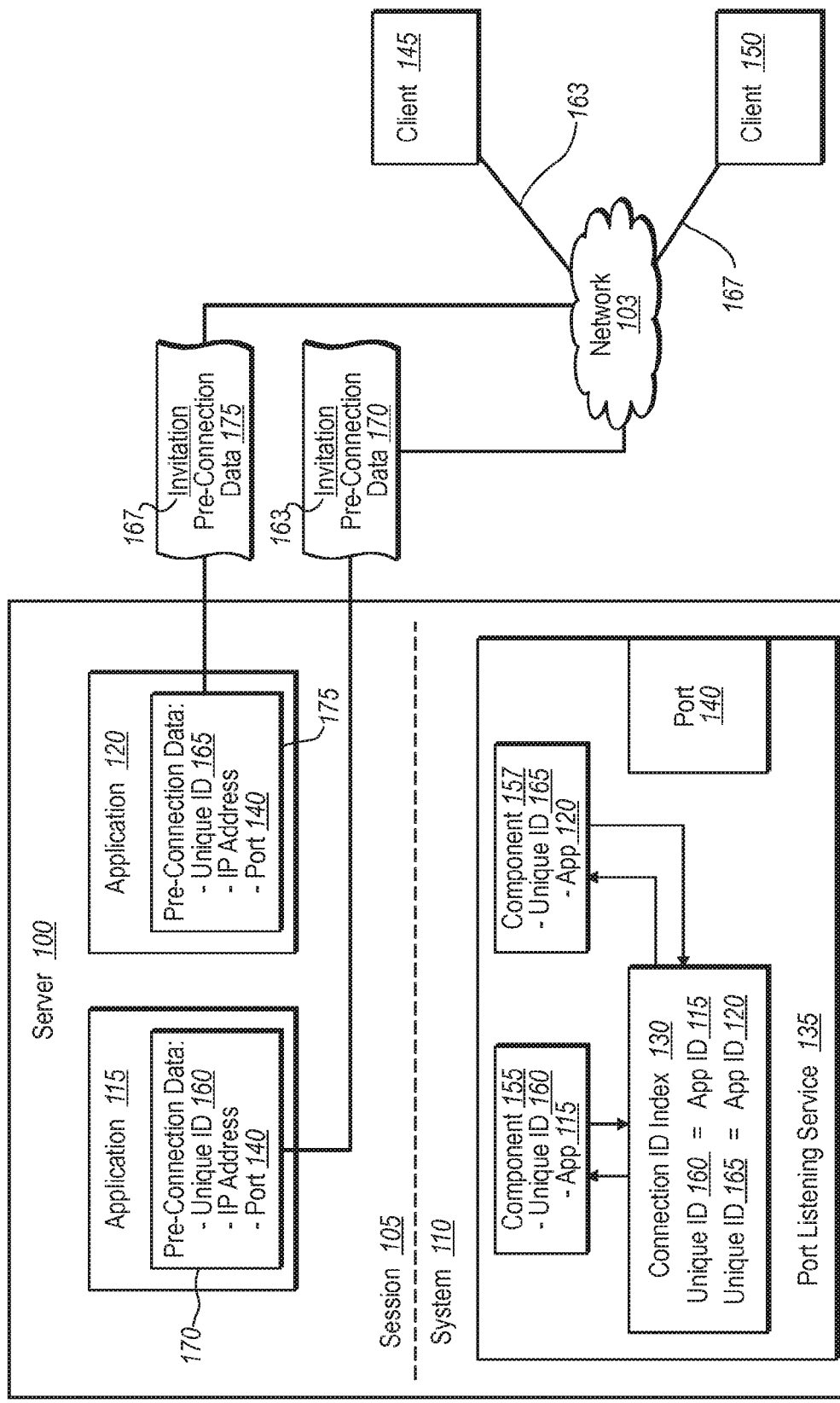
FIG. 1C illustrates the schematic diagram as shown in FIG. 1B, wherein multiple applications invite clients to communicate through the single port, where the invitation includes data provided by the port listening service, in accordance with an implementation of the present invention.

For example, FIG. 1C shows that application 115 sends invitation message 163 to client 145, where invitation message 163 includes pre-connection data 170. Application 115 does not necessarily need to perform a specific step of sending this pre-connection data 170 in advance, however. In particular, in some implementations, client 145 may already know the identifier found in pre-connection data 170 without the server actually sending it to the client. For example, the identifier could be accomplished by establishing a well-known rule, such as basing the identifier on the client computer name (which is known to application 115) or on the user name of the user logged in at client 145. The server would then know through some pre-established protocol to associate the user name with an appropriate application, such as application 115 that is accepting connections through the port listening service 135.

In any event, FIG. 1C also shows that application 120 sends invitation message 167 to client 150, where invitation message 167 includes pre-connection data 175. Generally, messages 163 and 167 can comprise any type of data communication, such as email, instant messaging, or some other network communication form. In at least one implementation, messages 163 and 167 comprise extensible markup language ("XML") documents that are streamed to a collaboration API (not shown) installed at corresponding clients 145 and 150. In one implementation, pre-connection data, in particular unique connection ID 160, 165, is further presented as base64 text.

Generally, the given client application does not need to read, parse, process, or otherwise interpret the given pre-connection data it has received other than, perhaps, to identify the return network address and port number for communicating with server 100. In some cases, the client can simply use the pre-connection data to connect to a specific application through a commonly used static port. For example, a single given client could receive several different invitation messages from different server applications at the same server. If used properly by that client, each different set of pre-connection data could allow the client to have several corresponding different server application connections through the same static port at the same server.

Figure 1D:
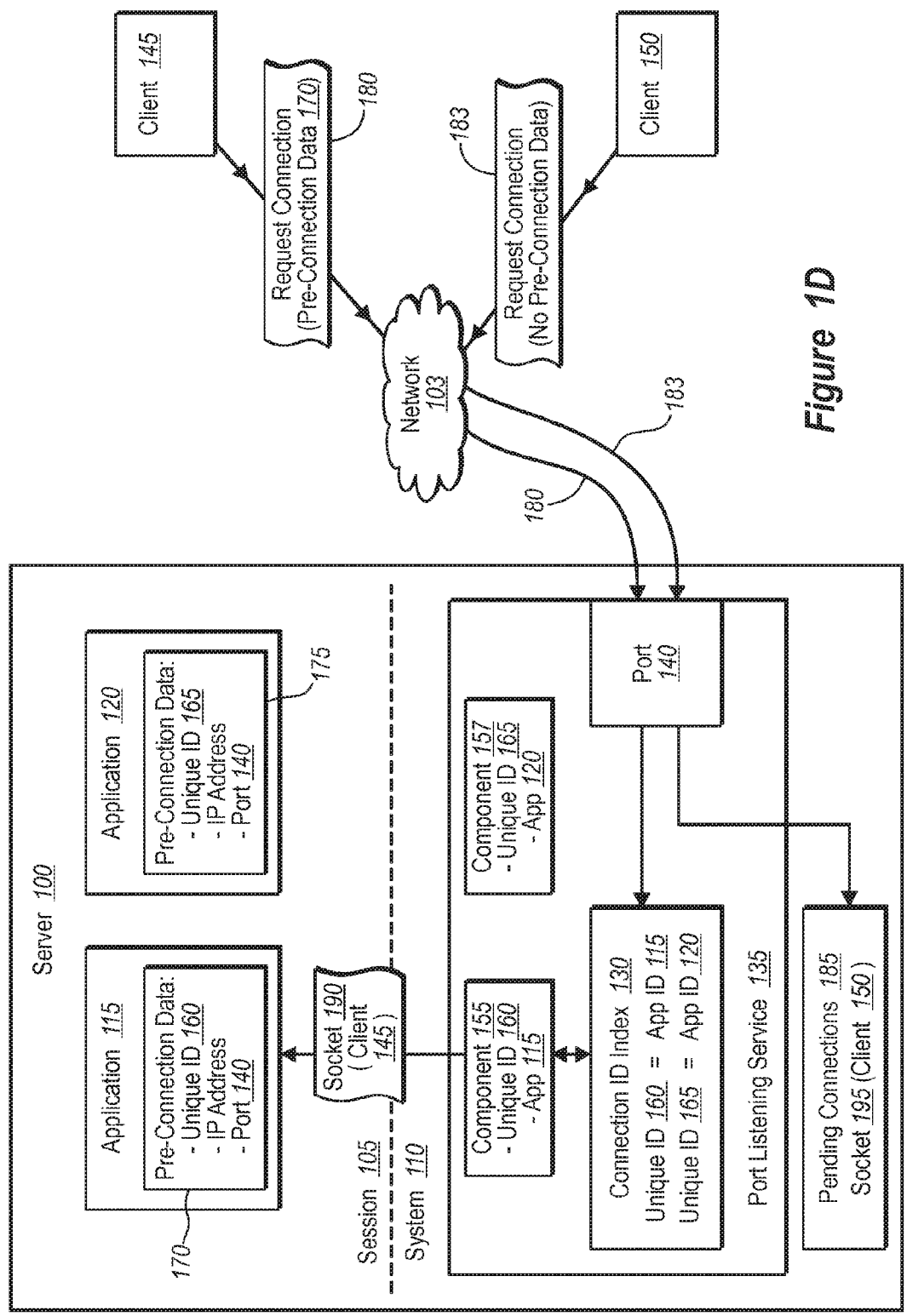
FIG. 1D illustrates the schematic diagrams of FIGS. 1B-1C, where the multiple clients attempt to communicate with the multiple applications through the single port, in accordance with an implementation of the present invention.

For example, FIG. 1D shows that client 145 requests a connection with server 100 by sending connection request 180 over network 103, where connection request 180 includes pre-connection data 170. As previously mentioned, this pre-connection data contains the network address for server 100, the port number for port 140, and the unique connection ID 160 sent previously by application 115. Each of these pieces of data can be used to specifically direct the connection request to the appropriate application behind the port. For example, the network address provides routing information for message 180 to arrive at server 100, the port number identifies the specific entry point into server 100, and unique ID 160 provides an identification of the application used to handle the connection.

Thus, for example, FIG. 1D further shows that, upon receipt, listening service 135 at port 140 (e.g. by a listener, not shown, assigned by listening service 135) passes socket 190 onto application 115, where socket 190 corresponds with connection ID 160 provided in connection request 180. In one implementation, this transfer can involve passing a handle of socket 190 to application 115. Thus, application 115 now has control over socket 190, and can communicate freely with client 145 (and any other client submitting unique ID 160 in a connection request) through port 140. This communication can occur using any appropriate communication protocol between the application and remote client, although some commonly used protocols in this case might include Remote Desktop Protocol ("RDP"), as well as Remote Procedure Call ("RPC").

As discussed herein, multiple applications can communicate with this or any other clients through port 140. Nevertheless, for this to occur, each such connection will need to include its own unique connection ID, so that different applications, and even different instances of the same application, can be distinguished. For example, FIG. 1D also shows that client 150 sends a connection request 183 to server 100 over network 103. In this case, connection request 183 does not contain any pre-connection data, and thus likely contains only a network address and port number for port 140, as required with general TCP communication. Since connection request 183 does not contain any pre-connection data, however, listening service 135 cannot provide a socket to an application. Rather, FIG. 1D shows that listening service 135 passes a socket for client 150 into a "pending connections" 185 store.

In particular, listening service 135 allows for a temporary network connection to occur between listening service 135 and client 150 through port 140, but does not allow communication with any particular application until client 150 provides this data. In some cases, listening service 135 may even drop the connection, or simple wait a certain amount of time until receiving the pre-connection data. Once client 150 provides this pre-connection data (e.g., data 175), listening service 135 can then determine if the unique ID is accurate, and, if so, pass a socket for that unique ID to the appropriate application, such as application 120.

Accordingly, FIGS. 1A through 1D illustrate a number of different components and schematics that can be used to enable multiple applications operating in a session level to communicate through the same static port. As identified above, these components and schematics enable this functionality at least in part due to the use of additional pre-connection data that can be used to associate a connection with a specific application. One will appreciate that, in addition to enabling multiple server applications to use the same port, this functionality can also be used to stem certain types of denial-of-service ("DOS") types of attacks.

In particular, some types of DOS attacks can occur when an outside actor overloads a computer system with network connection requests, which can ultimately shut down the computer system and, in some cases, allow the actor to compromise system level information on the computer. The components described above can help stem these sorts of attacks since connection requests that do not contain pre-connection data never result in the listening service 135 providing control of a socket for that connection to a server application. Rather, each connection can be either expressly denied if the pre-connection data is not found in the first packet of the connection request, or dropped after some predetermined time of residing in pending connections store 185. Accordingly, implementations of the present invention can provide a number of useful security features.

Figure 2:
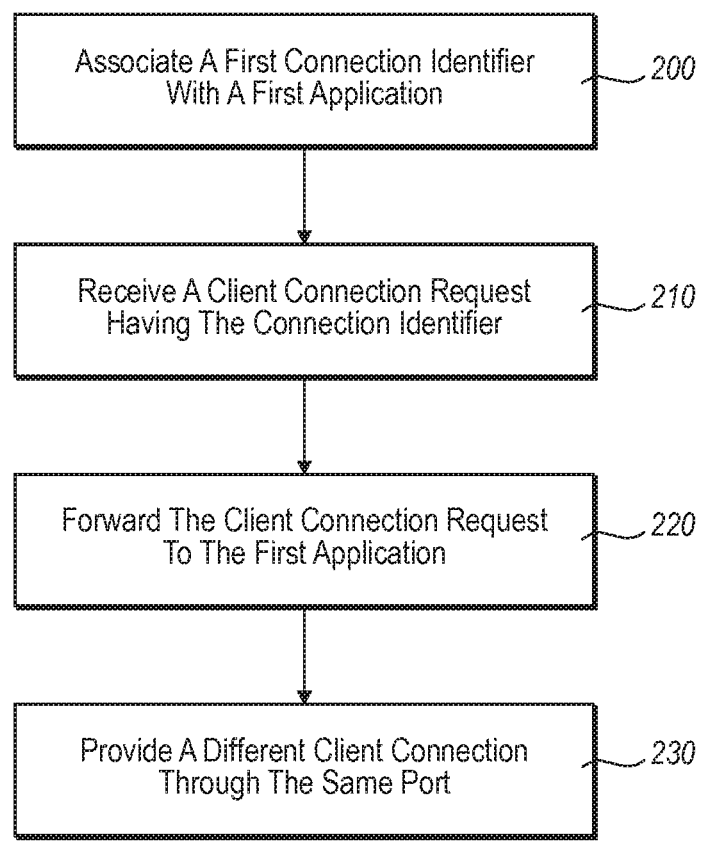
FIG. 2 illustrates a flowchart of a sequence of acts in a method from the perspective of a server for communicating with clients through a single port with multiple applications, in accordance with an implementation of the present invention.
Figure 3:
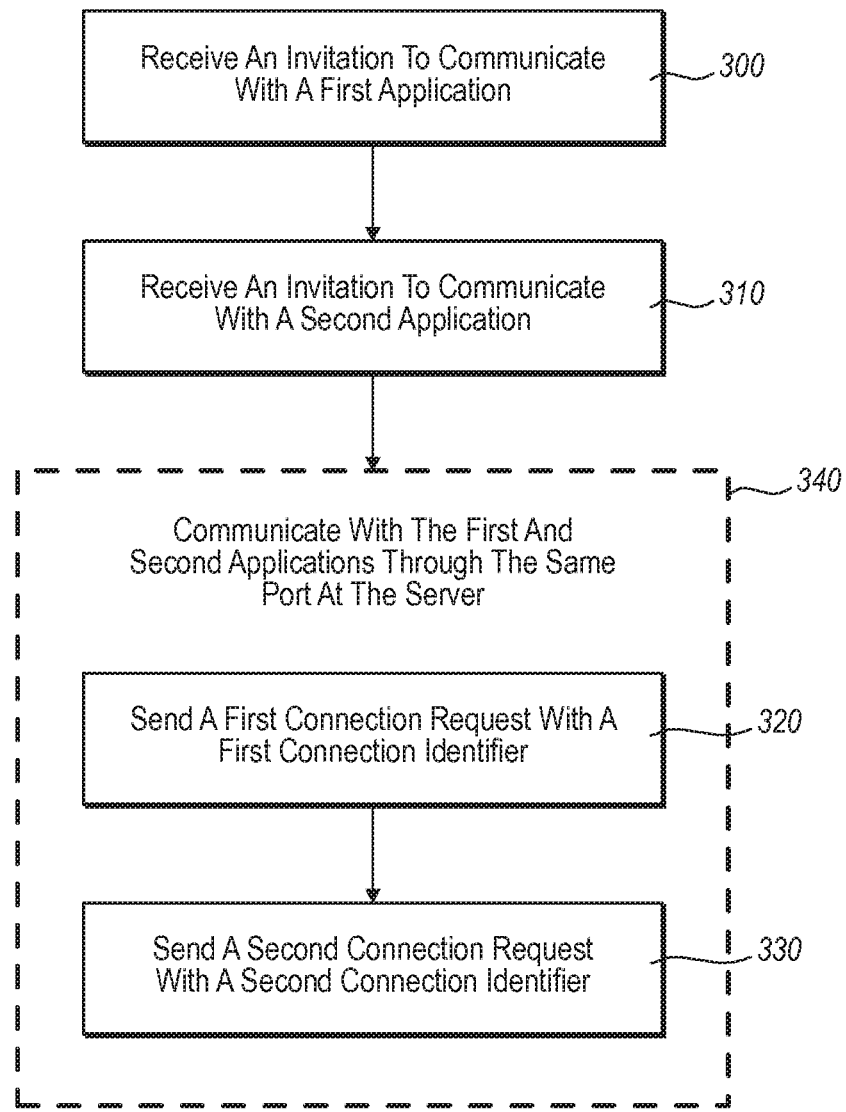
FIG. 3 illustrates a flowchart of a sequence of one or more acts and steps in a method from the perspective of a client for communicating with multiple server applications through a single port at the server, in accordance with an implementation of the present invention.

In addition to the foregoing, implementations of the present invention can also be described in terms of one or more functional steps and corresponding non-functional acts for performing a particular method. In particular, FIGS. 2 and 3 illustrate methods comprising a series of acts and/or steps from the perspective of a server (e.g., server 100) and a client (e.g., client 145, 150), respectively, for communicating with multiple server applications through a single static port at the server. FIGS. 2 and 3 and the following discussion also include some reference to the terms "first" and/or "second." It should be appreciated that these designations are primarily to suggest distinctions between terms, rather than a certain sequence. For example, a "first application" may or may not be a first application used or otherwise acting in a sequence, but is one that is at least different from a "second application." Similarly, a "second application" need only be different from a "first application," and is therefore not necessarily an application that must be used or otherwise accessed after or before the "first application."

In any event, FIG. 2 shows that a method from the perspective of a server (or sharing computer system) of providing a plurality of applications with communicative access to a single port comprises an act 200 of associating a first connection identifier with a first application. Act 200 includes associating a first connection identifier with a first application and a second connection identifier with a second application, wherein the first and second applications are operating at a session level. For example, port listening service 135, which is operating in a system level 110 of server 100, receives ready messages 113 and 123 from instances of applications (e.g., 115, 120) that are running in a session level 105 of server 100. Service 135 further hosts a corresponding component object (e.g., 155, 157) created by these applications, and associates application identifiers (e.g., "App ID 115", "App ID 120") in messages 113, 123 to corresponding unique connection IDs 160, 165.

In addition, FIG. 2 shows that the method comprises an act 210 of receiving a client connection request having the connection identifier. Act 210 includes receiving a client connection request, the client connection request including the port number, a network address for the sharing computer system, and the first connection identifier. For example, application 115 sends pre-connection data 170 to client 145 via message 167 over an XML data stream. Client 145, in turn, sends connection request 180 to server 100, where request 180 includes pre-connection data 170 received in message 167.

FIG. 2 also shows that the method comprises an act 220 of forwarding the client connection request to the first application, such that the first application connects with the client through the port. For example, upon identifying the unique connection ID 160 found in pre-connection data 170 of message 180, listening service 135 forwards control of socket 190, which is associated with unique connection ID 160 to server application 115. Furthermore, FIG. 2 shows that the method comprises an act 230 of providing a different client connection through the same port. Act 230 includes providing a different client connection to the second application through the port corresponding to the port number.

For example, as shown in FIG. 1D, client 150 sends connection request 183, which does not contain any of the pre-connection data 175 it received previously in message 163. Upon receiving message 183, listening service 135 allows for a connection between client 150 and server 100, but not with any application, at least in part since one is not immediately identifiable from request 180. Accordingly, listening service 135 associates the connection request with socket 195, which corresponds with client 150 and unique connection ID 165, and stores socket 195 in pending connection store 185. Listening service 135 can then hold this connection until it receives pre-connection data 175, or simply drop this connection after some predetermined time.

FIG. 3 illustrates an alternative method in accordance with an implementation of the present invention from the client perspective for communicating with plurality of applications through a single port at the sharing computer system. In particular, FIG. 3 shows that this method can comprise an act 300 of receiving an invitation to communicate with a first application. Act 300 includes receiving a first invitation to communicate with a first application at a server computer system, the first invitation including at least a port number and a first connection identifier. For example, client 145 receives message 167, which includes an invitation to connect with application 115 at server 100. Message 167 further includes pre-connection data, which includes at least unique connection ID 160 associated with application 115, as well as the network address of server 100 and a port number associated with port 140.

In addition, FIG. 3 shows that the method comprises an act 310 of receiving an invitation to communicate with a second application. Act 310 includes receiving a second invitation to communicate with a second application at the server computer system, the second invitation including at least the port number and a second connection identifier. For example, although not explicitly shown, client 145 could also receive invitation 163, which includes different unique ID 165, which is associated with application 120. As with message 167, message 163 also includes a network address for server 100, and the port number for port 140. Hence, messages 163 and 167 differ at least by their corresponding unique connection IDs (i.e., 160 compared with 165) in this case.

Furthermore, FIG. 3 shows that the method comprises a step 340 for communicating with the first and second applications through the same port at the server. Step 340 includes communicating with the first and second applications at the server through the port number, such that the client communicates over a network with multiple applications through the same static port of the server. For example, client 145, if acting on invitations 163 and 167, can communicate through port 140 with server applications 115 and 120.

Although step 340 can include any number or order of corresponding acts for accomplishing the step, FIG. 3 shows that step 340 comprises an act 320 of sending a first connection request with a first connection identifier. Act 320 includes sending a first connection request to the server, the first connection request comprising the first connection identifier. For example, client 145 can send message 180 to server 100 via port 140, where message 180 includes pre-connection data 170, and where pre-connection data 170 includes unique connection ID 160.

FIG. 3 also shows that step 340 comprises an act 330 of sending a second connection request with a second connection identifier. Act 330 includes sending a second connection request to the server, the second connection request comprising the second connection identifier. For example, client 145 can send another similar message to connection request message (not shown) to server 100, where the similar connection request differs at least by including pre-connection data 175, which includes unique connection ID 165.

Upon receiving these first and second connection requests from client 145, and upon identifying the unique connection IDs associated with each request, listening service 135 can assign control of different communication sockets for each connection to each different application instance (e.g., 115, 120). As such, applications 115 and 120 have separate connections with the client through the same static port, or port 140 for example.

The methods described in FIGS. 2 and 3, therefore, provide a number of ways in which clients and servers can connect to multiple applications through the same server port efficiently. As previously mentioned, this provides a number of advantages to present systems, particularly those where the limited number of static ports can present a concern, such as in network systems that implement firewalls.

The embodiments of the present invention may comprise a special purpose or general-purpose computer including various computer hardware, as discussed in greater detail below. In particular, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method, implemented at a client computer system having at least one processor and that is in communication with a sharing computer system which provides simultaneous network connections between a plurality of applications running at the sharing computer system to one or more client computer systems, including the client computer system, through a single static port, the method comprising:

an act of receiving a first invitation to communicate with a first application at a sharing computer system, the first invitation including at least a port number and a first unique connection identifier, the first unique connection identifier corresponding to a first socket connection established at the sharing computer system between a port listening service and the first application of a plurality of applications running at the sharing computer system that share the static port;

an act of receiving a second invitation to communicate with a second application at the sharing computer system, the second invitation including at least the port number and a second unique connection identifier, the second unique connection identifier corresponding to a second socket connection established at the sharing computer system between the port listening service and a second application of the plurality of applications running at the sharing computer system that share the static port, wherein the second unique connection identifier is distinct from the first unique connection identifier;

an act of sending a first connection request to the sharing computer system, the first connection request comprising each of:
(i) the port number associated with the static port,
(ii) a network address identifying the sharing computer system, and
(iii) the first unique connection identifier identifying the first application, the first unique connection identifier being distinct from both the particular port number and the network address; and an act of sending a second connection request to the sharing computer system, the second connection request comprising the second unique connection identifier.

2. The method of claim 1, wherein each of the first and second connection requests are sent to a port listening service of the sharing computer system that is configured to listen to the static port for client connection requests that contain unique connection identifiers and to forward any client connection request, including the first and second client requests, to corresponding applications having associated unique connection identifiers.

3. The method of claim 1, wherein the second client connection request includes each of:

(i) the particular port number associated with the static port,
(ii) the network address identifying the sharing computer system, and
(iii) the second unique connection identifier identifying the second application, the second unique connection identifier being distinct from the particular port number, the network address, and the first unique connection identifier.

4. The method as recited in claim 1, further comprising:
sending a third client connection request to the sharing computer system that lacks any unique connection identifier and which is stored at the sharing computer system as a pending connection request.

5. The method as recited in claim 1, wherein both of the first unique connection identifier and the second unique connection identifier are received by the client in an XML document from the sharing.

6. The method as recited in claim 1, wherein the first unique connection identifier comprises one or more of a user name or an email address.

7. The method as recited in claim 1, further comprising an act of receiving an indication from at least the first application that the first application is ready to communicate with client computer system.

8. A client computer system comprising:
at least one hardware processor; and
one or more storage medium having stored thereon computer-executable instructions that, when executed by the at least one hardware processor, implement a method comprising:

an act of receiving a first invitation to communicate with a first application at a sharing computer system, the first invitation including at least a port number and a first unique connection identifier, the first unique connection identifier corresponding to a first socket connection established at the sharing computer system between the port listening service and the first application of a plurality of applications running at the sharing computer system that share a static port;

an act of receiving a second invitation to communicate with a second application at the sharing computer system, the second invitation including at least the port number and a second unique connection identifier, the second unique connection identifier corresponding to a second socket connection established at the sharing computer system between the port listening service and a second application of the plurality of applications running at the sharing computer system that share the static port, wherein the second unique connection identifier is distinct from the first unique connection identifier;

an act of sending a first connection request to the sharing computer system, the first connection request comprising each of:
(i) the port number associated with the static port,
(ii) a network address identifying the sharing computer system, and
(iii) the first unique connection identifier identifying the first application, the first unique connection identifier being distinct from both the particular port number and the network address; and an act of sending a second connection request to the sharing computer system, the second connection request comprising the second unique connection identifier.

9. The client computer system of claim 8, wherein each of the first and second connection requests are sent to a port listening service of the sharing computer system that is configured to listen to the static port for client connection requests that contain unique connection identifiers and to forward any client connection request, including the first and second client requests, to corresponding applications having associated unique connection identifiers.

10. The client computer system of claim 8, wherein the second client connection request includes each of:
   (i) the particular port number associated with the static port,
   (ii) the network address identifying the sharing computer system, and
   (iii) the second unique connection identifier identifying the second application, the second unique connection identifier being distinct from the particular port number, the network address, and the first unique connection identifier.

11. The client computer system of claim 8, wherein the first unique connection identifier comprises one or more of a user name or an email address.

12. The client computer system of claim 8, wherein the method further comprises an act of receiving an indication from at least the first application that the first application is ready to communicate with client computing system.

13. A computer storage device having stored computer-executable instructions that, when executed at a client computing system having at least one processor, implements a method comprising:
   an act of receiving a first invitation to communicate with a first application at a sharing computer system, the first invitation including at least a port number and a first unique connection identifier, the first unique connection identifier corresponding to a first socket connection established at the sharing computer system between the port listening service and the first application of a plurality of applications running at the sharing computer system that share a static port;
   an act of receiving a second invitation to communicate with a second application at the sharing computer system, the second invitation including at least the port number and a second unique connection identifier, the second unique connection identifier corresponding to a second socket connection established at the sharing computer system between the port listening service and a second application of the plurality of applications running at the sharing computer system that share the static port, wherein the second unique connection identifier is distinct from the first unique connection identifier;
   an act of sending a first connection request to the sharing computer system, the first connection request comprising each of:
   (i) the port number associated with the static port,
   (ii) a network address identifying the sharing computer system, and
   (iii) the first unique connection identifier identifying the first application, the first unique connection identifier being distinct from both the particular port number and the network address; and
   an act of sending a second connection request to the sharing computer system, the second connection request comprising the second unique connection identifier.

14. The computer storage device of claim 13, wherein each of the first and second connection requests are sent to a port listening service of the sharing computer system that is configured to listen to the static port for client connection requests that contain unique connection identifiers and to forward any client connection request, including the first and second client requests, to corresponding applications having associated unique connection identifiers.

15. The computer storage device of claim 13 wherein the second client connection request includes each of:
   (i) the particular port number associated with the static port,
   (ii) the network address identifying the sharing computer system, and
   (iii) the second unique connection identifier identifying the second application, the second unique connection identifier being distinct from the particular port number, the network address, and the first unique connection identifier.

16. The computer storage device of claim 13, wherein the first unique connection identifier comprises one or more of a user name or an email address.

17. The computer storage device of claim 13, wherein the method further comprises an act of receiving an indication from at least the first application that the first application is ready to communicate with client computing system.

18. The method of claim 1, wherein the first and second applications are both running concurrently and both concurrently share the same static port.

* * * * *